(12) United States Patent
Shimakawa et al.

(10) Patent No.: US 8,749,129 B2
(45) Date of Patent: Jun. 10, 2014

(54) IMAGE DISPLAY DEVICE

(75) Inventors: Shigeru Shimakawa, Kanagawa-ken (JP); Naotada Okada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/600,401

(22) Filed: Aug. 31, 2012

(65) Prior Publication Data

US 2013/0229798 A1 Sep. 5, 2013

(30) Foreign Application Priority Data

Sep. 1, 2011 (JP) .................................. 2011-191011

(51) Int. Cl.
*H01J 1/62* (2006.01)
(52) U.S. Cl.
USPC .......................................... 313/500; 313/512
(58) Field of Classification Search
USPC ......................................... 313/500, 504–512
See application file for complete search history.

(56) References Cited

U.S. PATENT DOCUMENTS

2011/0102302 A1* 5/2011 Watanabe et al. .................. 345/4

FOREIGN PATENT DOCUMENTS

| JP | 9-37194 A | 2/1997 |
| JP | 2001-147486 A | 5/2001 |
| JP | 2005-17614 A | 1/2005 |
| JP | 2006-308707 A | 11/2006 |
| JP | 2010-38960 A | 2/2010 |

OTHER PUBLICATIONS

Office Action issued Jul. 17, 2013, in Japanese patent Application No. 2011-191011 with English translation.

* cited by examiner

*Primary Examiner* — Anne Hines
(74) *Attorney, Agent, or Firm* — Oblon, Spivak, McClelland, Maier & Neustadt, L.L.P.

(57) ABSTRACT

According to one embodiment, an image display device includes first and second display devices and an optical plate. The first display device includes a first display region and a frame region provided around the first display region. The second display device includes a second display region and a frame region provided around the second display region. The optical plate covers the first and second display regions and includes a light incident surface and a light exit surface. The light incident surface opposes the first and second display regions. The optical plate is configured to emit at least a portion of light emitted from any first point of the first display region and incident on an opposing point of the first point of the light incident surface in a direction from the first display region side toward the second display region side.

19 Claims, 5 Drawing Sheets

IMAGE DISPLAY DEVICE

CROSS-REFERENCE TO RELATED APPLICATIONS

This application is based upon and claims the benefit of priority from the prior Japanese Patent Application No. 2011-191011, filed on Sep. 1, 2011; the entire contents of which are incorporated herein by reference.

FIELD

Embodiments described herein relate generally to an image display device.

BACKGROUND

In the case where an image is displayed on a large screen by arranging multiple display devices, the image is subdivided and displayed on the display devices; and one image is displayed on the large screen as an entirety.

However, gaps are observed in the image in the case where the display is performed by arranging the multiple display devices because the display devices have frames.

In one method, a lens array is used to remove such gaps. The lens array is disposed on the display surfaces of the display devices; and the images which are displayed by the display devices are enlarged and projected onto a screen by the lens array.

However, in such a method, when the image that is subdivided is projected onto the screen by the lens array, two lenses are necessary at each part of the array for the subdivided images to overlap with good precision. It is difficult for such an image display device to be thin; and such an image display device is unsuitable as a compact image display device of a notebook-sized personal computer or a portable display.

DETAILED DESCRIPTION

In general, according to one embodiment, an image display device includes a first display device, a second display device and an optical plate. The first display device includes a first display region and a frame region provided around the first display region. The second display device includes a second display region and a frame region provided around the second display region. The optical plate covers the first display region and the second display region. The optical plate includes a light incident surface and a light exit surface on a side opposite to the light incident surface. The light incident surface opposes the first display region and the second display region. The optical plate is configured so that at least a portion of light emitted from the first point of the first display region should be incident on an opposing point of the first point of the light incident surface in a direction of a second point positioned on the second display region side in a direction from the first display region side toward the second display region side.

Various embodiments will be described hereinafter with reference to the accompanying drawings.

First Embodiment

Embodiments of the invention will now be described with reference to the drawings.

Figure 1:
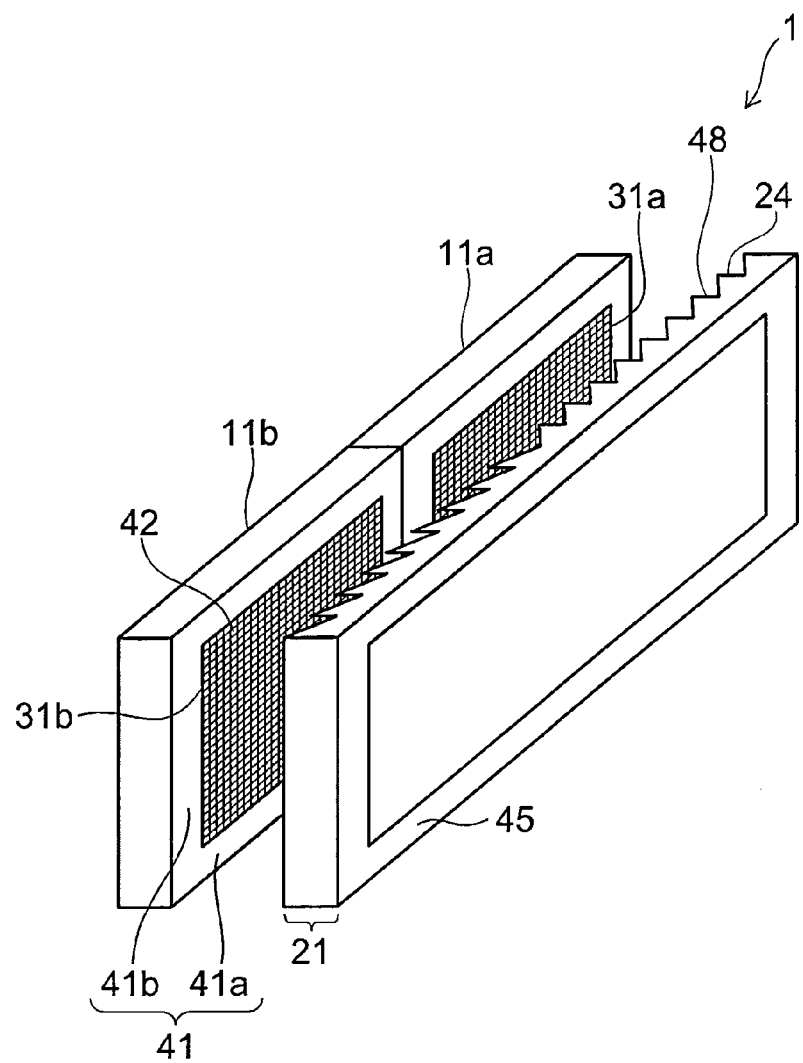
FIG. 1 is a perspective view illustrating an image display device according to a first embodiment.

FIG. 1 is a perspective view illustrating an image display device according to a first embodiment.

Figure 2:
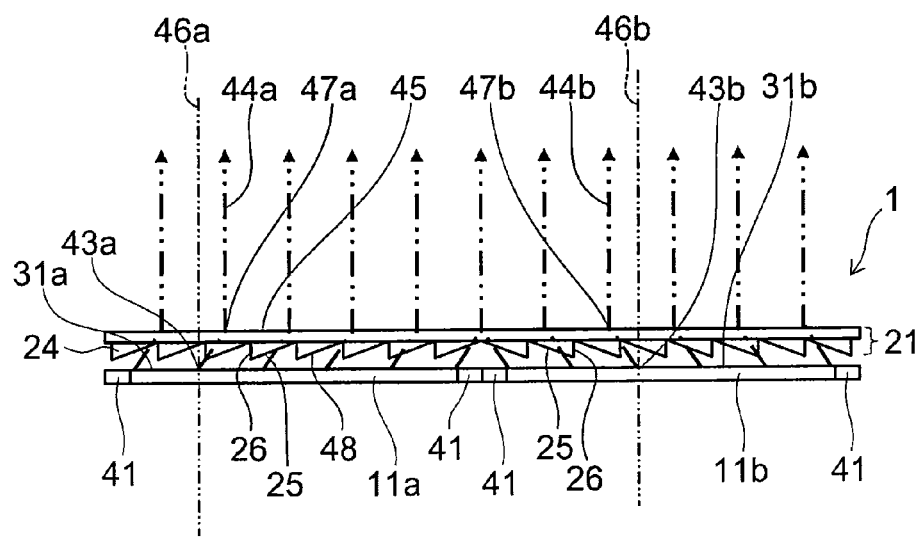
FIG. 2 is a cross-sectional view illustrating the image display device according to the first embodiment.

FIG. 2 is a cross-sectional view illustrating the image display device according to the first embodiment.

Figures 3A, 3B:
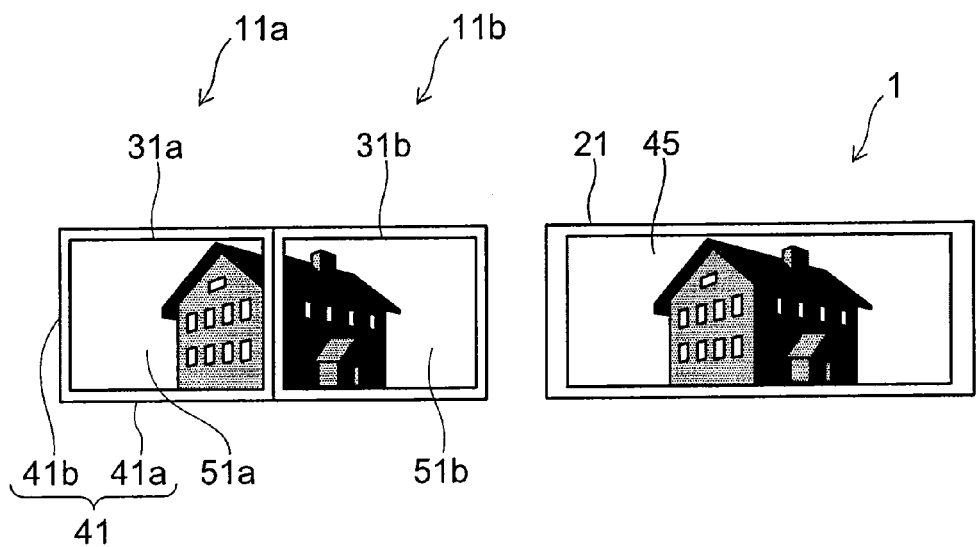
FIG. 3A is a plan view illustrating the display devices of the first embodiment.
FIG. 3B is a plan view illustrating the image display device according to the first embodiment.

FIG. 3A is a plan view illustrating the display devices of the first embodiment; and FIG. 3B is a plan view illustrating the image display device according to the first embodiment.

Figure 4:
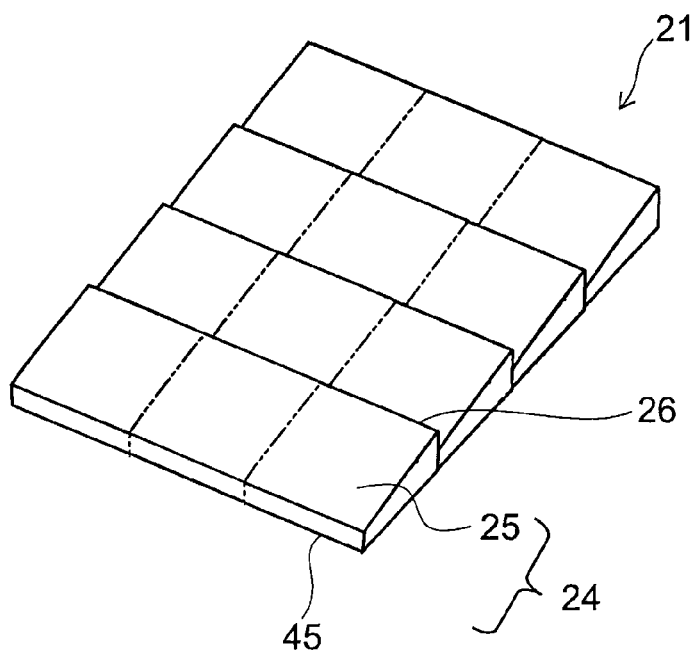
FIG. 4 is a perspective view illustrating the optical plate of the first embodiment.

FIG. 4 is a perspective view illustrating the optical plate of the first embodiment.

As illustrated in FIG. 1 to FIG. 3B, the optical plate 21 and multiple display devices, e.g., two display devices 11a and 11b, are provided in the image display device 1 according to this embodiment.

The display device 11a and the display device 11b are disposed to be adjacent to each other.

A display region 31a is provided in the display device 11a. A display region 31b is provided in the display device 11b.

Frame regions 41 are provided around the display region 31a and the display region 31b in the display device 11a and the display device 11b.

For example, the frame region 41 includes a region 41a along the long side of the rectangular display region 31a and a region 41b along the short side of the display region 31a.

The optical plate 21 is provided to cover the display region 31a and the display region 31b.

Multiple pixel filters 42 are provided in the display region 31a and the display region 31b. For example, each of the pixel filters 42 is a filter made of one color selected from red (R), green (G), and blue (B). Each of the pixel filters 42 is provided on a pixel on the display region 31a where multiple pixels are provided.

The pixel filters 42 are disposed two-dimensionally along two orthogonal directions in the plane of the display region 31a and the display region 31b, e.g., the direction in which the long sides of the display region 31a and the display region 31b extend (called the horizontal direction herein below) and the direction in which the short sides extend (called the perpendicular direction herein below). The arrangement direction of the display device 11a and the display device 11b matches the horizontal direction.

As illustrated in FIG. 4, multiple prisms 24 are formed in the optical plate 21. The prisms 24 are provided in a light incident surface 48 on the display region 31a and display region 31b side of the optical plate 21.

Each of the prisms 24 extends in a direction, i.e., a perpendicular direction, that is parallel to the display regions 31a and 31b and orthogonal to a direction from the display region 31a side toward the display region 31b side. The multiple prisms 24 are disposed periodically in the direction from the display region 31a side toward the display region 31b side, i.e., the horizontal direction.

The prism 24 includes two surfaces 25 and 26 which have different angles from a light exit surface 45 on the side of the optical plate 21 opposite to the display region 31a and the display region 31b. The surface 25 and the surface 26 extend in the direction in which the prism extends. The angle between the light exit surface 45 and the surface 25 is smaller than the angle between the light exit surface 45 and the surface 26.

For the prisms 24 of the portion of the optical plate 21 on the display region 31a, for example, the portion opposing the display region 31a, the surface 25 is oriented toward the display region 31b side. Also, the surface 26 is oriented toward the side opposite to the display region 31b side.

On the other hand, for the prisms 24 of the portion of the optical plate 21 on the display region 31b, for example, the portion opposing the display region 31b, the surface 25 is oriented toward the display region 31a side. Also, the surface 26 is oriented toward the side opposite to the display region 31a side.

An operation of the image display device 1 according to this embodiment will now be described.

In the image display device 1 according to this embodiment, the display device 11a displays an image 51a in the display region 31a; and the display device 11b displays an image 51b in the display region 31b. The frame regions 41 are interposed between the image 51a displayed in the display region 31a and the image 51b displayed in the display region 31b. In other words, the distance between the image 51a and the image 51b is not less than the width of at least two frame regions 41.

At least a portion of light 44a through the optical plate 21 passes through a point 47a on the light exit surface 45 positioned on the display region 31b side of a straight line 46a through a point 43a orthogonally to the display region 31a. The point 43a is the point in an emission surface of the display device 11a. In such a case, the optical plate 21 changes the travel direction of the light emitted from the point 43a in a direction tilted toward the display region 31b side with respect to the straight line 46a to approach the direction in which the straight line 46a extends to be emitted from the point 47a. Thereby, a portion of the light 44a emitted from the point 43a exits through the point 47a along the straight line 46a.

On the other hand, at least a portion of light 44b emitted from any point 43b of the display region 31b through the optical plate 21 passes through a point 47b of the light exit surface 45 positioned on the display region 31a side of a straight line 46b through the point 43b orthogonally to the display region 31b. The point 43b is the point in an emission surface of the display device 11b. In such a case, the optical plate 21 changes the travel direction of the light emitted from the point 43b in a direction tilted toward the display region 31a side with respect to the straight line 46b to approach the direction in which the straight line 46b extends to be emitted from the point 47b. Thereby, a portion of the light 44b emitted from the point 43b is emitted from the point 47b along the straight line 46b.

Thereby, the image 51a displayed in the display region 31a is displayed at the light exit surface 45 such that the position is moved toward the display region 31b side when viewing the image display device 1 from the front of the image display device 1 from a direction perpendicular to the light exit surface 45. On the other hand, the image 51b displayed in the display region 31b is displayed at the light exit surface 45 such that the position is moved toward the display region 31a side. In such a case, the image 51a and the image 51b at the light exit surface 45 have the same sizes as the image 51a and the image 51b of the display region 31a and the display region 31b.

As a result, the width of the frame regions 45 disposed between the image 51a and the image 51b at the light exit surface 45 is displayed to be narrower than the width of the frame regions 45 of the display regions 31a and 31b. In other words, the distance between the image 51a and the image 51b is less than the width of two of the frame regions 41. In particular, the width of the frame regions 41 at the light exit surface 45 is zero as viewed from the optimal position in the case where the positional relationship between the display region 31a, the display region 31b, and the optical plate 21 is optimized. In other words, the frame regions 41 are not visually confirmed.

Effects of this embodiment will now be described.

According to the image display device 1 according to this embodiment, in the case where the display device 11a and the display device 11b which are provided with the frame regions 41 are arranged and the image 51a and the image 51b are displayed respectively in the display region 31a and the display region 31b, the distance between the image 51a and the image 51b decreases and the frame regions 41 are displayed to be narrow at the light exit surface 45 when viewed from the direction perpendicular to the light exit surface 45. In particular, the width of the frame regions 41 at the light exit surface 45 is zero and the frame regions 41 are not visually confirmed in the case where the positional relationship between the display regions, the optical plate 21, and the viewpoint is optimized. Accordingly, the image 51a and the image 51b can be displayed as one image without gaps.

Because only the positions of the image 51a and the image 51b displayed on the display device 11a and the display device 11b are moved, the images are not enlarged as in the case where lenses are used. Therefore, it is unnecessary for the light exit surface 45 to have a surface area greater than the combined surface area of the two display regions 31a and 31b and the frame regions 41; and a large device is unnecessary.

Further, multiple prisms are arranged as the optical plate 21. Therefore, the optical plate 21 can have the same function as one prism that has the display region 31a as a bottom surface while being thinner than such a prism.

Because one optical plate is used, the image display device 1 can be thinner.

Second Embodiment

Figure 5:
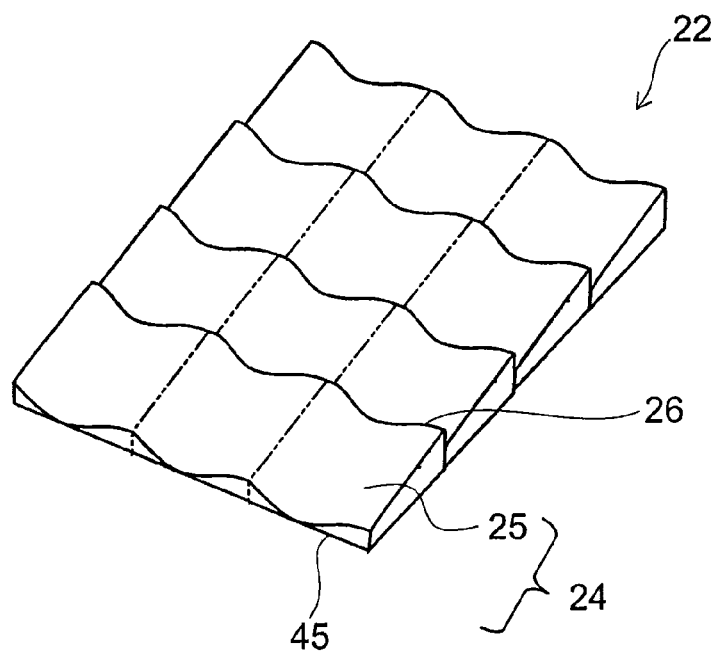
FIG. 5 is a perspective view illustrating an optical plate of a second embodiment.

FIG. 5 is a perspective view illustrating an optical plate of a second embodiment.

In the optical plate 22 of the second embodiment as illustrated in FIG. 5, the thickness of the optical plate including the multiple prisms 24 changes not only in the arrangement direction (the horizontal direction) of the prisms 24 but also within a constant range along the direction (the perpendicular direction) in which the prisms 24 extend. The thickness of the optical plate may change with a constant period or may change randomly in the direction in which the prisms 24 extend.

In the case where the thickness changes with a constant period, it is unnecessary for the amplitude of the thickness to be constant.

In the first embodiment described above, there are cases where moire occurs in the image due to the light passing through the optical plate 21. The moire occurs as an interference fringe that occurs due to interference between the period at which the pixel filters 42 are disposed and the period of a micro waviness of the surface 25 and the surface 26 that is in the direction in which the prisms 24 extend and is too small to visually confirm, or interference between the period at which the pixel filters 42 are disposed and the period at which the thickness of the optical plate 21 changes along the configurations of the prisms 24 in the direction in which the prisms 24 are disposed. The visibility of the image display device markedly decreases in the case where the period of the moire becomes long enough to be visually confirmed.

According to the image display device in which the optical plate 22 according to this embodiment is provided, the interference with the period at which the pixel filters 42 are disposed can be prevented because the periodicity is disturbed for the micro waviness of the surface 25 and the surface 26 that is in the direction in which the prisms 24 extend and is too small to visually confirm. Therefore, the occurrence of moire can be suppressed.

Third Embodiment

Figure 6:
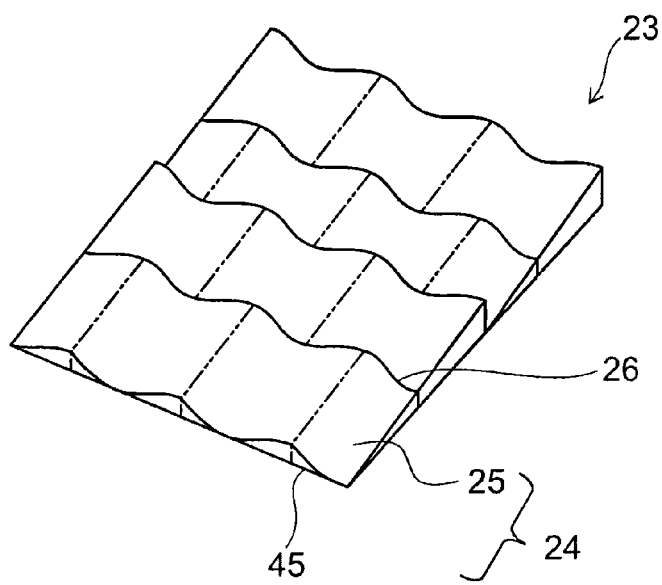
FIG. 6 is a perspective view illustrating an optical plate of a third embodiment.

FIG. 6 is a perspective view illustrating an optical plate of a third embodiment.

As illustrated in FIG. 6, the optical plate 23 according to this embodiment has a configuration in which the phase of the change of the thickness is shifted by $\pi/2$ between mutually-adjacent prisms 24 in the case where the thickness changes periodically along the direction in which the prisms 24 extend. The phase of the shift is not limited to $\pi/2$.

According to the image display device in which the optical plate 23 according to this embodiment is provided, the periodicity at which the thickness of the optical plate 21 changes along the configurations of the prisms 24 in the direction in which the prisms 24 are disposed can be disturbed. Thereby, the occurrence of moire can be suppressed.

Fourth Embodiment

An image display device according to a fourth embodiment will now be described.

Figures 7A, 7B:
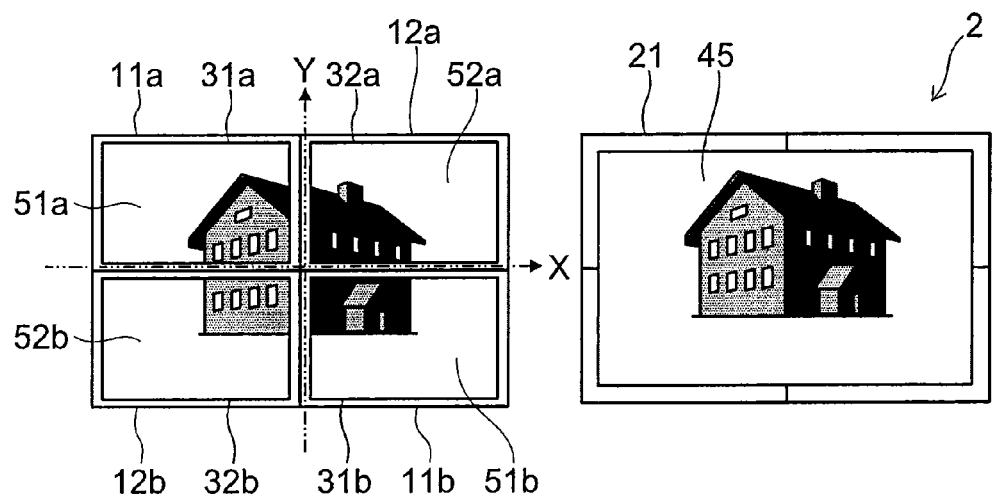
FIG. 7A is a plan view illustrating display devices of a fourth embodiment.
FIG. 7B is a plan view illustrating the image display device according to the fourth embodiment.

FIG. 7A is a plan view illustrating display devices of the fourth embodiment; and FIG. 7B is a plan view illustrating the image display device according to the fourth embodiment.

As illustrated in FIGS. 7A and 7B, the four display devices 11a, 11b, 12a, and 12b are provided in the image display device 2. The four display devices 11a, 11b, 12a, and 12b are disposed in a matrix configuration having two rows and two columns. The display regions 31a, 31b, 32a, and 32b are provided respectively in the display devices 11a, 11b, 12a, and 12b.

An XY coordinate system is introduced to describe the disposition of the display devices. In the case where the display devices 11a, 11b, 12a, and 12b are disposed in a matrix having two rows and two columns, the X axis is taken to be the boundary between the two rows; one of the X-axis directions is taken to be the +X direction; and the reverse direction is taken to be the −X direction. The boundary between the two columns is taken to be the Y axis; one of the Y-axis directions is taken to be the +Y direction; and the reverse direction is taken to be the −Y direction. The display device 11a and the display device 11b are disposed in the first quadrant and the third quadrant of the XY coordinate system. The display device 12a and the display device 12b are disposed in the second quadrant and the fourth quadrant of the XY coordinate system. Thereby, one row includes the display devices 11a and 12a; and one row includes the display devices 12b and 11b. Also, one column includes the display devices 11a and 12b; and one column includes the display devices 12a and 11b.

One optical plate 21 is provided on the four display regions 31a, 31b, 32a, and 32b.

The multiple prisms 24 extending in a direction orthogonal to the direction from the display region 31a toward the display region 31b are disposed in the portions of the optical plate 21 disposed on the display region 31a and the display region 31b. For the prisms 24 of the portion of the optical plate 21 on the display region 31a, the surface 25 is oriented toward the display region 31b side. Also, the surface 26 is oriented toward the side opposite to the display region 31b side. For the prisms 24 of the portion of the optical plate 21 on the display region 31b, the surface 25 is oriented toward the display region 31a side. Also, the surface 26 is oriented toward the side opposite to the display region 31a side.

The multiple prisms 24 extending in a direction orthogonal to the direction from the display region 32a toward the display region 32b are disposed in the portions of the optical plate 21 disposed on the display region 32a and the display region 32b. For the prisms 24 of the portion of the optical plate 21 on the display region 32a, the surface 25 is oriented toward the display region 32b side. Also, the surface 26 is oriented toward the side opposite to the display region 32b side. For the prisms 24 of the portion of the optical plate 21 on the display region 32b, the surface 25 is oriented toward the display region 32a side. Also, the surface 26 is oriented toward the side opposite to the display region 32a side.

In other words, in this embodiment, the optical plate 21 can be divided into four regions corresponding to the display regions; and the direction in which the prisms 24 extend is different between the four regions. For each of the regions, the direction in which the prisms 24 extend is a direction tilted with respect to both the horizontal direction and the perpendicular direction.

According to the image display device 2 according to this embodiment, the image 51a and the image 51b of the display region 31a and the display region 31b are displayed such that the positions at the light exit surface 45 move to approach each other as viewed from a direction perpendicular to the light exit surface 45. An image 52a and an image 52b of the display region 32a and the display region 32b also are displayed such that the positions at the light exit surface 45 move to approach each other.

Thereby, the distance between the images at the light exit surface 45 decreases and the frame regions 41 are displayed to be narrow in the case where the display device 11a, the display device 11b, the display device 12a, and the display device 12b which are provided with the frame regions 41 are arranged and the images 51a, 51b, 52a, and 52b are displayed respectively in the display region 31a, the display region 31b, the display region 32a, and the display region 32b. In particular, in the case where the positional relationship between the display regions, the optical plate, and the viewpoint is optimized, the images 51a, 51b, 52a, and 52b can be displayed at the light exit surface 45 as one image without gaps.

Fifth Embodiment

An image display device according to a fifth embodiment will now be described.

Figure 8A:
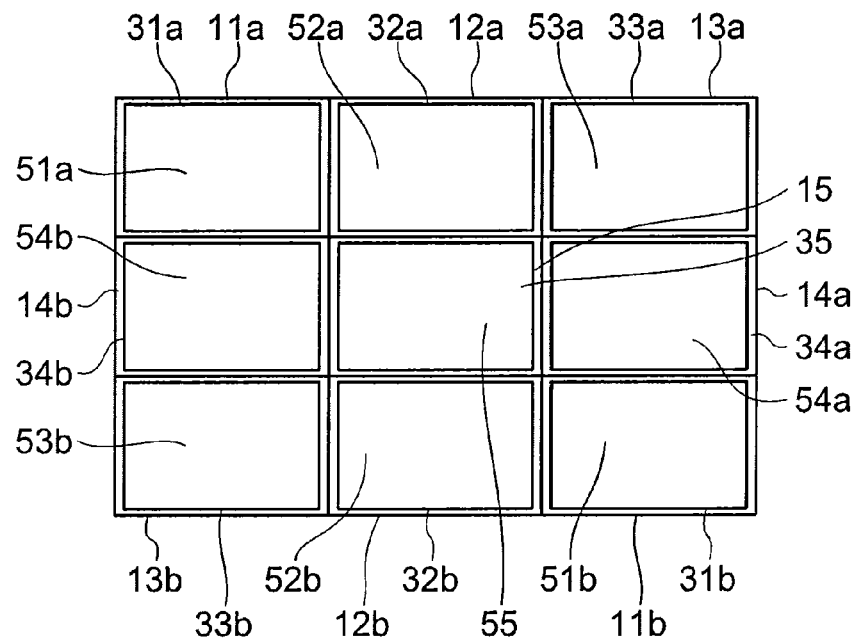
FIG. 8A is a plan view illustrating display devices of a fifth embodiment.
Figure 8B:
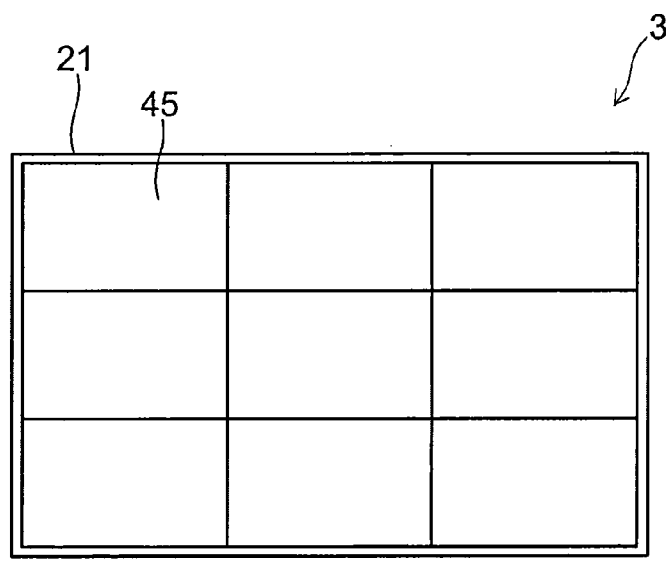
FIG. 8B is a plan view illustrating the image display device according to the fifth embodiment.

FIG. 8A is a plan view illustrating display devices of the fifth embodiment; and FIG. 8B is a plan view illustrating the image display device according to the fifth embodiment.

As illustrated in FIG. 8A and 8B, the nine display devices 11a, 11b, 12a, 12b, 13a, 13b, 14a, 14b, and 15 are provided in the image display device 3. The display regions 31a, 31b, 32a, 32b, 33a, 33b, 34a, 34b, and 35 are provided respectively in the nine display devices 11a, 11b, 12a, 12b, 13a, 13b, 14a, 14b, and 15.

The nine display devices 11a, 11b, 12a, 12b, 13a, 13b, 14a, 14b, and 15 are disposed in a matrix configuration having 3 rows and 3 columns. One row includes the display devices 11a, 12a, and 13a; one row includes the display devices 14b, 15, and 14a; and one row includes the display devices 13b, 12b, and 11b.

One column includes the display devices 11a, 14b, and 13b; one column includes the display devices 12a, 15, and 12b; and one column includes the display devices 13a, 14a, and 11b. The display device 15 is positioned in the center of the matrix.

One optical plate 21 is provided on the nine display regions.

The multiple prisms 24 extending in a direction orthogonal to the direction from the display region 31a toward the display region 31b are disposed in the portions of the optical plate 21 disposed on the display region 31a and the display region 31b. For the prisms 24 of the portion of the optical plate 21 on the display region 31a, the surface 25 is oriented toward the display region 31b side. Also, the surface 26 is oriented toward the side opposite to the display region 31b side. For the prisms 24 of the portion of the optical plate 21 on the display region 31b, the surface 25 is oriented toward the display region 31a side. Also, the surface 26 is oriented toward the side opposite to the display region 31a side.

The multiple prisms 24 extending in a direction orthogonal to the direction from the display region 32a toward the display region 32b are disposed in the portions of the optical plate 21 disposed on the display region 32a and the display region 32b. For the prisms 24 of the portion of the optical plate 21 on the display region 32a, the surface 25 is oriented toward the display region 32b side. Also, the surface 26 is oriented toward the side opposite to the display region 32b side. For the prisms 24 of the portion of the optical plate 21 on the display region 32b, the surface 25 is oriented toward the display region 32a side. Also, the surface 26 is oriented toward the side opposite to the display region 32a side.

The multiple prisms 24 extending in a direction orthogonal to the direction from the display region 33a toward the display region 33b are disposed in the portions of the optical plate 21 disposed on the display region 33a and the display region 33b. For the prisms 24 of the portion of the optical plate 21 on the display region 33a, the surface 25 is oriented toward the display region 33b side. Also, the surface 26 is oriented toward the side opposite to the display region 33b side. For the prisms 24 of the portion of the optical plate 21 on the display region 33b, the surface 25 is oriented toward the display region 33a side. Also, the surface 26 is oriented toward the side opposite to the display region 33a side.

The multiple prisms 24 extending in a direction orthogonal to the direction from the display region 34a toward the display region 34b are disposed in the portions of the optical plate 21 disposed on the display device 34a and the display device 34b. For the prisms 24 of the portion of the optical plate 21 on the display region 34a, the surface 25 is oriented toward the display region 34b side. Also, the surface 26 is oriented toward the side opposite to the display region 34b side. For the prisms 24 of the portion of the optical plate 21 on the display region 34b, the surface 25 is oriented toward the display region 34a side. Also, the surface 26 is oriented toward the side opposite to the display region 34a side.

On the other hand, the portion of the optical plate 21 disposed on the display device 15 transmits an image 55 displayed in the display region 35 as-is in a direction perpendicular to the display region 35. Then, the image 55 is displayed without the position at the light exit surface 45 being moved as viewed from a direction perpendicular to the light exit surface 45. For example, prisms are not formed in the portion of the optical plate 21 disposed on the display device 15.

Thereby, the images other than the image 55, i.e., the eight images 51a, 51b, 52a, 52b, 53a, 53b, 54a, and 54b, are displayed such that the positions at the light exit surface 45 move to approach the image 55.

As a result, the distances between the images at the light exit surface 45 decrease and the frame regions 41 are displayed to be narrow in the case where the nine display devices 11a, 11b, 12a, 12b, 13a, 13b, 14a, 14b, and 15 which are provided with the frame regions 41 are arranged and the images 51a, 51b, 52a, 52b, 53a, 53b, 54a, 54b, and 55 are displayed respectively in the display regions 31a, 31b, 32a, 32b, 33a, 33b, 34a, 34b, and 35. In particular, in the case where the positional relationship between the display regions, the optical plate, and the viewpoint is optimized, the images 51a, 51b, 52a, 52b, 53a, 53b, 54a, 54b, and 55 can be displayed at the light exit surface 45 as one image without gaps.

Although the prisms 24 are formed in the light incident surface 48 of the optical plate 21 in the first to fifth embodiments described above, this is not limited thereto. The prisms 24 may be formed in the light exit surface 45 of the optical plate 21 or may be formed in both the light incident surface 48 and the light exit surface 45.

According to the embodiments described above, an image display device that includes a combination of multiple display devices can be provided to perform a display having fine gaps between multiple images that are displayed by the multiple display devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An image display device, comprising:
a first display device including a first display region and a frame region provided around the first display region;
a second display device including a second display region and a frame region provided around the second display region; and
an optical plate covering the first display region and the second display region, the optical plate including a light incident surface and a light exit surface on a side opposite to the light incident surface, the light incident surface opposing the first display region and the second display region; and
a plurality of prisms formed in the optical plate,
the optical plate being configured to emit at least a portion of light emitted from any first point of the first display region and incident on an opposing point of the first point of the light incident surface in a direction of a second point positioned on the second display region side in a direction from the first display region side toward the second display region side.

2. The device according to claim 1, wherein the optical plate is configured to emit at least a portion of light emitted from any third point of the second display region and incident on an opposing point of the third point of the light incident surface in a direction of a fourth point positioned on the first display region side in a direction from the second display region side toward the first display region side.

3. The device according to claim 2, wherein a second image displayed in the second display region is displayed at the light exit surface with a position of the second image moved toward the first display region side when viewed from a direction perpendicular to the light exit surface.

4. The device according to claim 1, wherein
a first surface and a second surface are formed in each of the prisms, and an angle between the first surface and the light exit surface is smaller than an angle between the second surface and the light exit surface,
the first surface is oriented toward the second display region side and the second surface is oriented toward a side opposite to the second display region side for the prism formed in a portion of the optical plate corresponding to a region opposing the first display region, and
the first surface is oriented toward the first display region side and the second surface is oriented toward a side opposite to the first display region side for the prism formed in a portion of the optical plate corresponding to a region opposing the second display region.

5. The device according to claim 1, wherein the prisms extend in the optical plate in a first direction orthogonal to a direction from the first display region toward the second display region.

6. The device according to claim 5, wherein a thickness of the optical plate changes periodically along the first direction.

7. The device according to claim 6, wherein a phase of the change of the thickness is shifted by a constant phase between mutually-adjacent prisms.

8. The device according to claim 7, wherein the phase of the change of the thickness is $\pi/2$.

9. The device according to claim 5, wherein
a plurality of pixel filters is provided in the first display region, and the pixel filters are arranged two-dimensionally along a second direction and a third direction intersecting the second direction in a plane parallel to the first display region, and
the first direction intersects the second direction and the third direction.

10. The device according to claim 5, wherein
a plurality of pixel filters is provided in the first display region, and the pixel filters are arranged two-dimensionally along a second direction and a third direction intersecting the second direction in a plane parallel to the first display region, and
the first direction is the same direction as the second direction or the third direction.

11. The device according to claim 1, wherein
two sets made of the first display device and the second display device are provided,
the first display devices and the second display devices included in the two sets are disposed in a matrix configuration having two rows and two columns, and
the first display device and the second display device of one set are disposed in the first quadrant and the third quadrant of an XY coordinate system, and the first display device and the second display device of the other set are disposed in the second quadrant and the fourth quadrant of the XY coordinate system, where the X axis is at a boundary between the two rows, and the Y axis is at a boundary between the two columns.

12. The device according to claim 11, wherein the optical plate can be divided into four regions corresponding to the display regions of the display devices, and an extension direction of the prism is different between the four regions.

13. The device according to claim 11, wherein the optical plate can be divided into four regions corresponding to the display regions of the display devices, and an extension direction of the prism is a direction tilted with respect to both an extension direction of a long side of the display region and an extension direction of a short side of the display region for each of the four regions.

14. The device according to claim 1, wherein the prisms are disposed periodically in the optical plate in a direction from the first display region toward the second display region.

15. The device according to claim 1, wherein a first image displayed in the first display region is displayed at the light exit surface with a position of the first image moved toward the second display region side when viewed from a direction perpendicular to the light exit surface.

16. The device according to claim 15, wherein the first image at the light exit surface is the same size as the first image of the first display region.

17. The device according to claim 1, wherein a width between the first image and the second image at the light exit surface is narrower than a width between a first image displayed in the first display region and a second image displayed in the second display region.

18. The device according to claim 1, wherein
a plurality of sets formed of the first display device and the second display device are formed,
the first display device and the second display device forming the sets are disposed in a matrix configuration, and
the plurality of prisms extend in a direction orthogonal to a direction from the first display region toward the second display region in a portion disposed on the first display region and the second display region forming each of the sets in the optical plate.

19. The device according to claim 18, wherein the direction in which the prisms extend has the two sets.

* * * * *